Patented Aug. 25, 1925.

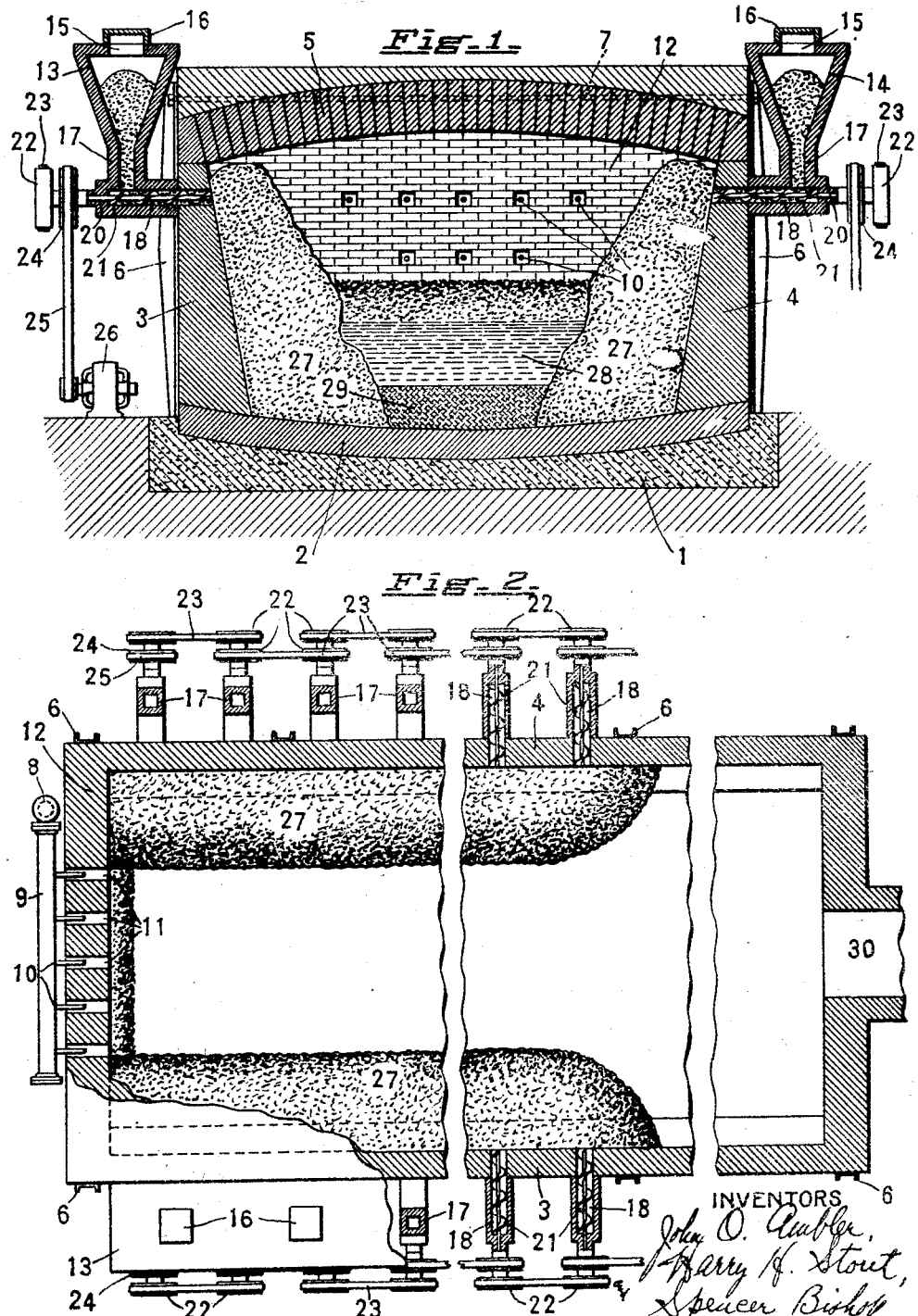

1,550,655

UNITED STATES PATENT OFFICE.

JOHN OWEN AMBLER, HARRY HOWARD STOUT, AND SPENCER BISHOP, OF CLIFTON, ARIZONA, ASSIGNORS TO PHELPS-DODGE CORPORATION, OF NEW YORK, N. Y., A CORPORATION OF NEW YORK.

METHOD AND APPARATUS FOR SMELTING.

Application filed August 29, 1922. Serial No. 585,004.

*To all whom it may concern:*

Be it known that we, JOHN OWEN AMBLER, HARRY HOWARD STOUT, and SPENCER BISHOP, citizens of the United States, residing at Clifton, in the county of Graham (Greenlee) and State of Arizona, have invented certain new and useful Improvements in Methods and Apparatus for Smelting, of which the following is a specification.

This invention relates generally to the smelting of ore for the extraction of metal therefrom.

In the extraction of copper, as an example, from its ores it is the practice to smelt the ore in blast furnaces, if the material is in relatively coarse condition, or in reverberatory furnaces, if the ore is in the form of relatively fine or small particles, to produce a matte and a slag which separate from each other in the furnace by reason of their different specific gravities. The lighter slag is skimmed off from time to time and thrown away while the matte is tapped at longer intervals and subjected to further treatment to remove ingredients such as iron and sulphur and leave the copper in a metallic state.

In the smelting of ores by the described method it has been heretofore the practice to intermittently charge smelting furnaces of the reverberatory type through holes in the roof which may be followed by the spreading of the material over the hearth with hand tools inserted through openings in the sides of the furnace. This method of charging is open to many serious objections.

The dropping of the charge intermittently through the roof openings from suitable hoppers causes the production of dust which combines with the silica brick with which the furnace is lined and fluxes or fuses the brick. It will be apparent that this action causes deterioration of the lining brick and necessitates expensive repairs.

The provision of charging openings in the roof cannot be effectively controlled to prevent the entry of "false air" to the interior of the furnace as a result of which dilution of the gases of combustion takes place with an attendant lowered temperature and reduction in the quantity of heat transmitted to the charge. The final result is a lowering of the furnace capacity with a corresponding substantial increase in the cost of the smelting operation. Attempts to lute or otherwise seal the connection between the feeding hoppers and the furnace roof at the openings invariably fail because of the variations in temperature and the resulting cracking and opening of the sealing material to permit access of air into the furnace.

The principal object of the present invention is to provide an ore smelting furnace which will be free from the objections referred to and in which the detrimental production of dust in the charging operation is overcome and the access of air to the furnace except through the firing openings is effectually prevented.

The invention includes the feeding of ore to the furnace in such manner that a bank of the charged material within the furnace covers and continually seals the charging openings during the smelting operation.

A preferred structural arrangement embodying the invention consists of a smelting furnace of the reverberatory type having charging openings in the side walls thereof through which ore is continuously fed by mechanical means, the rate of feeding being so regulated that a bank of accumulated charged material reaches a level within the furnace and adjacent the side walls thereof that is higher than the level of the charging openings and is there maintained to cover and continuously seal the inner ends of the charging openings and prevent the entrance of air therethrough into the furnace.

In the drawings in which a preferred form of the invention has been selected for illustration, Figure 1 is a view in transverse vertical section of a furnace embodying the invention, Figure 2 is a view in horizontal section taken on different levels of the furnace shown in Figure 1.

Referring to the drawings for a more detailed description there is shown at 1 a mass of suitable foundation material on which rests the hearth or bottom 2 of the furnace. The side walls 3 and 4 of the furnace support the arched roof 5 formed of suitable refractory material such as silica brick. The side walls may be reinforced by upright U-shaped beams 6 connected by stay rods 7 at their upper extremities. The furnace may be fired with different fuels such as gas, oil, or powdered coal which may be forced under pressure through the vertical pipe 8 and the horizontal manifold 9 which is provided with a plurality of projecting burner nozzles 10. The burner nozzles 10 discharge fuel directly into the furnace interior through a series of openings 11 formed in the end wall 12 of the furnace. The requisite air for combustion is supplied to the furnace at the burners and it is important for the most efficient operation that air be prevented from entering the furnace at any other point.

Arranged along the sides of the furnace are the elongated hoppers 13 and 14 provided with filling openings 15 and cover members 16. The hoppers are provided with downwardly extending discharge ducts 17 which communicate with charging tubes 18 leading into the interior of the furnace through the side walls thereof.

Any suitable means for mechanically feeding ore from the hoppers 13 and 14 into the furnace may be provided. A convenient form of mechanism for the purpose consists of shafts 20 axially mounted in the ducts 18 and carrying helical feed screw members 21. The shafts 20 may be driven through a series of pulleys 22 and chains or belts 23 from a drive pulley 24 connected through belt 25 with a suitable motor 26.

In the operation of the apparatus the ore, which ordinarily has been subjected to a roasting operation for the removal of sulphur and has been mixed with limestone to combine with the silica content of the material to form slag, is fed to the hoppers 13 and 14 while still hot from the roasting furnace. The hoppers are preferably insulated to prevent all possible loss of heat during the transfer of the material to the smelting furnace. The feeding mechanism is then set into operation at a rate such as will build up banks 27 of the material whose upper parts close the inner ends of the charging tubes as is clearly shown in the drawings. The entrance of air to the furnace through the charging openings is thereby completely shut off and the charging operation is continued during firing either continuously or intermittently at a rate such as will maintain the banks of ore within the furnace in sealing relation to the charging tubes.

It has been found that the inclined exposed surfaces of the banks or piles of ore 27 thus maintained along the sides of the furnace become sufficiently fused and plastic to offer the requisite mechanical resistance to the free discharge of material through the charging holes to maintain the banked condition of the material in sealing relation to the openings. The feeding of the material through the openings is thus caused to take place into masses of material so that the openings are never exposed to the hot atmosphere of the furnace and no air can enter through the openings to disturb the temperature conditions in the furnace chamber. A further important advantage arising out of the condition of surface fusion referred to is the total elimination of the production of dust which is aided by the feeding of the fresh material into the interior of the bank or pile.

The firing operation produces a mass of matte 29 immediately overlying the hearth or furnace bottom 2 and on which rests the lighter mass of slag 28. An exit flue 30 at the end of the furnace opposite the firing openings 11 provides for the discharge of the spent gases of combustion. Ordinarily the slag is skimmed from the surface of the matte from time to time through an opening, not shown, in the exit flue end of the furnace while the matte is tapped at greater intervals through openings, also not shown.

It will be seen that by charging the furnace through openings in the side wall in the manner described banks of ore are maintained within the furnace which provide an effective air seal to the charging openings and thereby prevent the entrance of surplus air to the furnace chamber and the production of dust with its attendant disadvantages. In its broader aspects the invention is not limited to the use of charging openings in the furnace side walls but comprehends also the charging of material through openings in the top or any other location, the controlling factor being the sealing of the charge opening by the charged material itself.

In the embodiment of the invention shown the banked masses of ore 27 along the opposite walls of the furnace are continuously being fused to provide a constant source of supply of liquefied material which flows down the slopes of the piles as it is produced to form the masses of matte and slag already referred to. The continuous removal of fused material as it flows downwardly along the slopes of the piles continuously exposes fresh surfaces to the fusing action of the hot gases and greatly increases the efficiency of the smelting operation over that of the ordinary type of furnace heretofore known and used.

What we claim is:—

1. That method of charging an ore-smelting furnace which consists in feeding the ore through a charging opening and in maintaining the opening continuously sealed with a pile of the charged material itself.

2. That method of charging an ore-smelting furnace which consists in feeding the ore through a charging opening into the side of a bank of charged material occupying a sealing relation to the opening.

3. That method of charging an ore-smelting furnace which consists in feeding the ore through a charging opening to form a bank of charged material to occupy a sealing relation to the opening and in thereafter feeding the material through the opening into the side of the bank of charged material to maintain the bank of material in sealing relation to the opening.

4. That method of charging an ore-smelting furnace which consists in feeding the ore through a charging opening formed in the side wall of the furnace into the side of a pile of ore produced by the charging process.

5. That method of operating an ore-smelting furnace which consists in feeding the ore into the furnace to form a pile on the slope of which fused material flows downwardly to constantly expose fresh surfaces to the smelting flame and in continuing to feed ore into the side of the pile opposite the fused surface.

6. That method of operating an ore-smelting furnace which consists in feeding the ore into the furnace to form a pile on the slope of which fused material flows downwardly to constantly expose fresh surfaces to the smelting flame, and in replenishing the pile by feeding material into the interior thereof to avoid disturbance of the surface being smelted.

7. That method of operating an ore-smelting furnace which consists in feeding the ore into the furnace to form a pile having a portion engaging one of the outer walls of the furnace and in feeding ore through an opening in the engaged portion of the wall into the interior of the pile whereby to prevent disturbance of the surface of the pile exposed to the smelting flame.

8. That method of operating an ore-smelting furnace which consists in feeding the ore continuously into the furnace to form a pile on the slope of which fused material flows downwardly to constantly expose fresh surfaces to the smelting flame, and in replenishing the pile by feeding material into the interior of the upper part thereof to avoid disturbance of the surface being smelted.

9. That method of operating an ore-smelting furnace which consists in feeding the ore continuously into the furnace to form a pile having a portion engaging one of the outer walls of the furnace and in feeding ore through an opening in the engaged portion of the wall into the interior of the upper part of the pile whereby to prevent disturbance of the surface of the pile exposed to the smelting flame.

10. That method of operating an ore-smelting furnace which consists in feeding the ore into the furnace to form a pile on the slope of which fused material flows downwardly to constantly expose fresh surfaces to the smelting flame, and in replenishing the pile by feeding material into the interior thereof to avoid disturbance of the surface being smelted.

11. That method of operating an ore-smelting furnace which consists in feeding the ore into the furnace to form a pile having a portion engaging one of the outer walls of the furnace in replenishing the pile through a passage opening into the interior of the pile.

In testimony whereof we affix our signatures.

JOHN OWEN AMBLER.
HARRY HOWARD STOUT.
SPENCER BISHOP.